Dec. 29, 1931.  A. M. JOHNSON ET AL  1,838,995
SPINDLE FEED MECHANISM FOR MACHINE TOOLS
Filed March 17, 1927   3 Sheets-Sheet 2
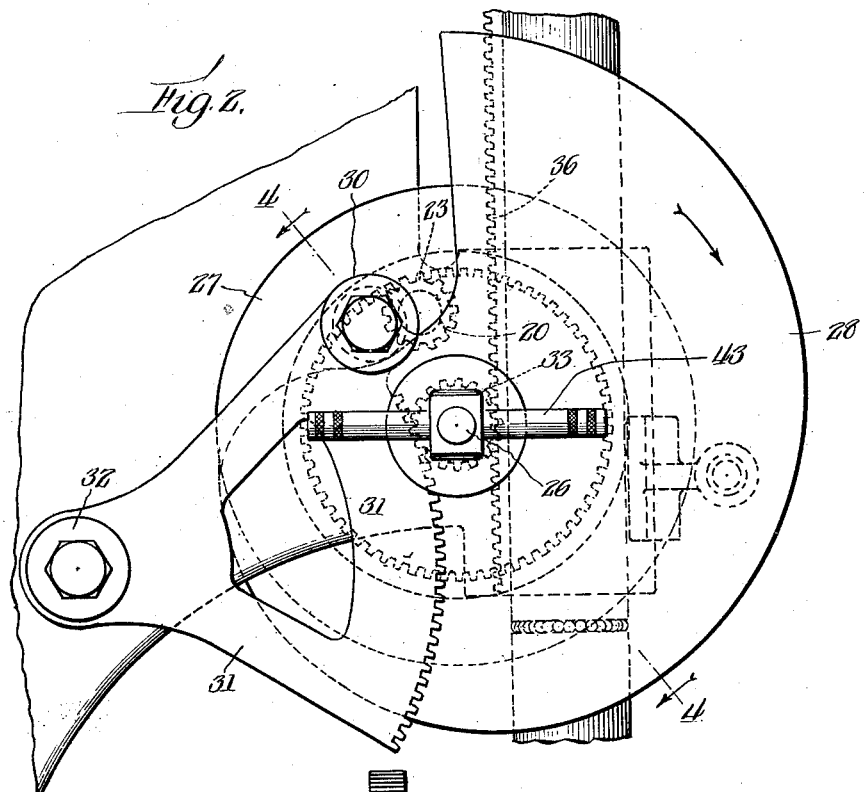
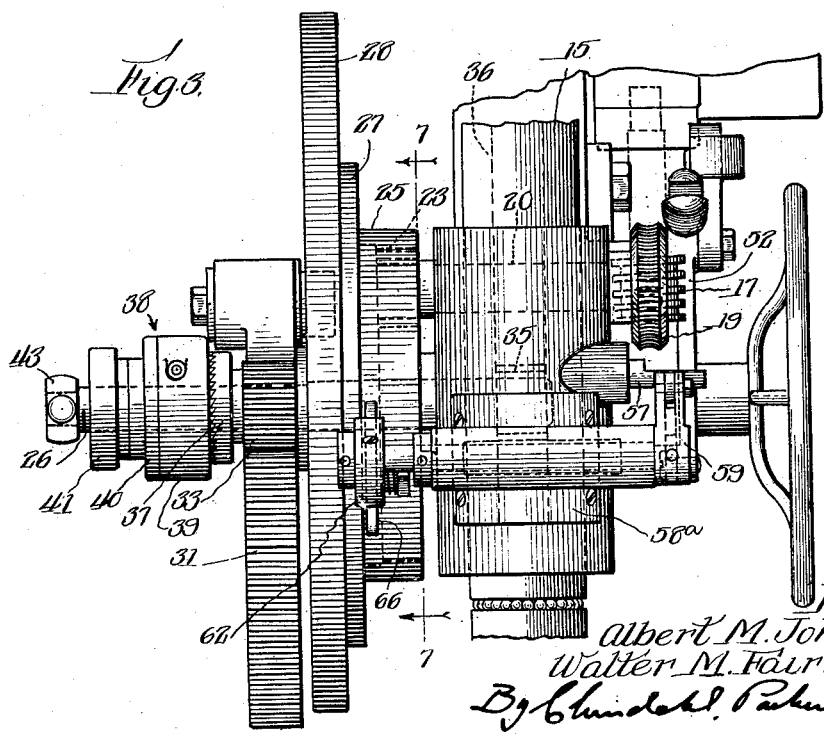

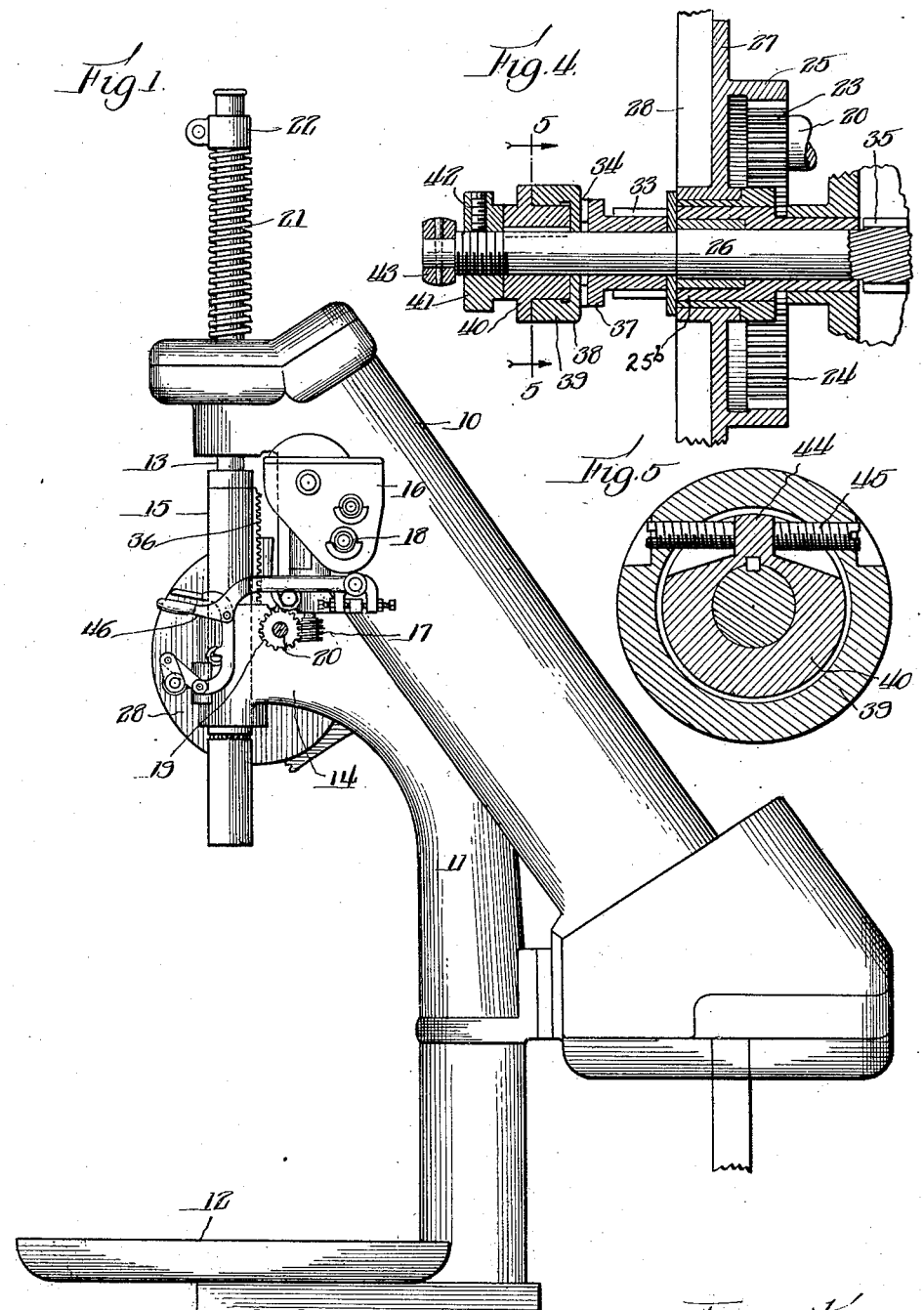

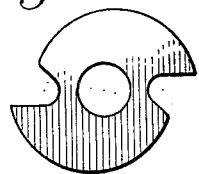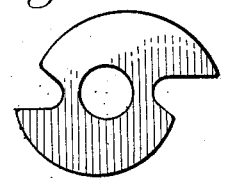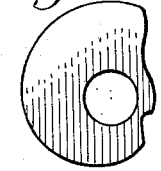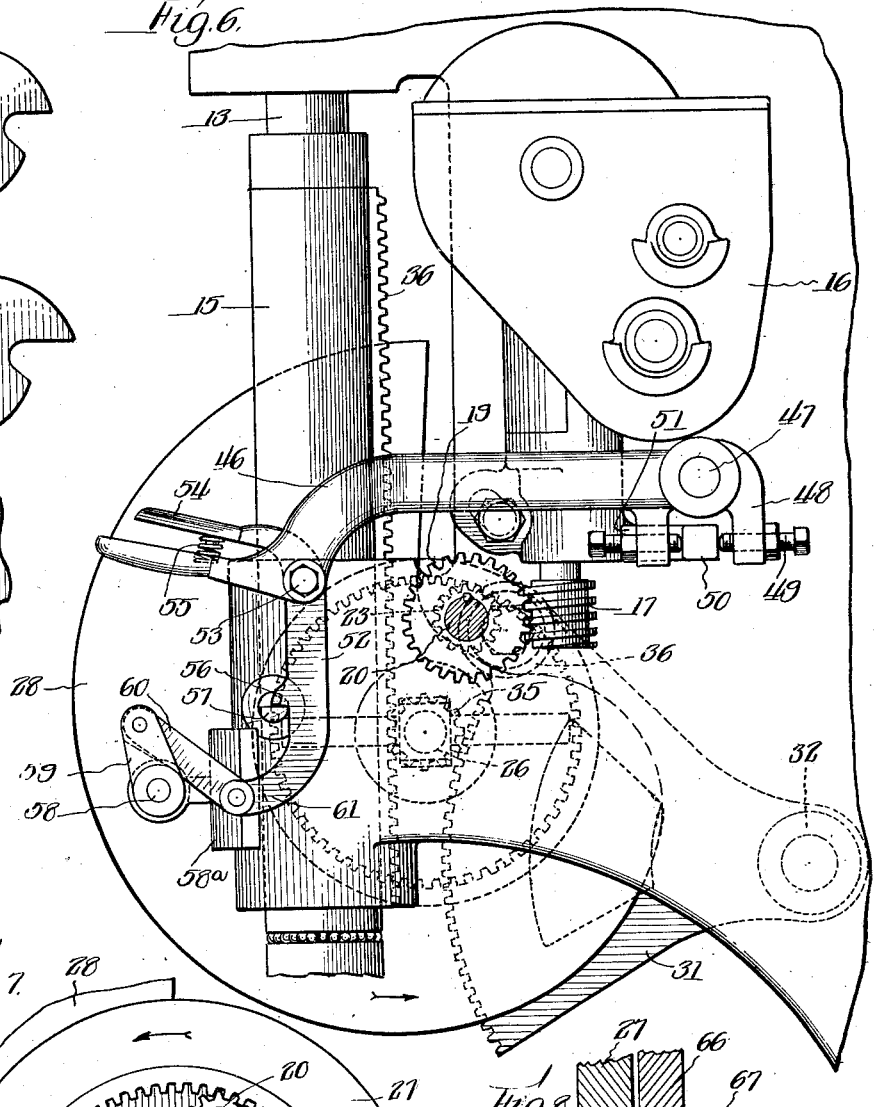

Patented Dec. 29, 1931

1,838,995

UNITED STATES PATENT OFFICE

ALBERT M. JOHNSON AND WALTER M. FAIRBAIRN, OF ROCKFORD, ILLINOIS, ASSIGNORS TO BARNES DRILL COMPANY, OF ROCKFORD, ILLINOIS, A CORPORATION OF ILLINOIS

SPINDLE FEED MECHANISM FOR MACHINE TOOLS

Application filed March 17, 1927. Serial No. 175,960.

The invention pertains in general to machine tools and has more particular reference to machine tools of the type employed for drilling, boring, facing and similar operations.

Machine tools of the character indicated commonly employ one or more tool-carrying spindles mounted for longitudinal and rotational movements and the present invention has to do with a means of a novel and advantageous character for imparting longitudinal feeding movement to the tool spindle or spindles.

It is the primary object of this invention to provide in a machine tool a spindle feeding mechanism of an improved character capable of effecting a rapid approach of the cutting tool to the work followed by a gradual feeding movement, which is positive in operation, capable of rapid and easy adjustment, and having a low manufacturing cost.

A further object is to provide a spindle feed mechanism employing cam means which may be quickly and easily varied to suit the many different conditions encountered in the use of machine tools of this character.

Another object is to provide a spindle feed mechanism capable of moving the spindle axially at a variable speed in one direction, and in which the position of the spindle relative to the feeding means may be easily adjusted to limit the extent of the feeding stroke within exceedingly fine graduations.

Still another object is to provide, in combination with the spindle feed mechanism, means of a simple and advantageous character for automatically interrupting the feed at any desired point in the feeding stroke.

The objects of the invention thus generally stated together with other and ancillary advantages are attained in the preferred embodiment of the invention illustrated in the accompanying drawings forming part hereof, but it should be understood that it is contemplated that various changes in the construction and arrangement employed may be made by those skilled in the art without departing from the spirit and scope of the invention as expressed in the appended claims.

Figure 1 is a fragmentary side elevational view of a machine tool such as a drilling machine, embodying our invention.

Fig. 2 is a fragmentary elevational view looking from the opposite side of the machine from that shown in Fig. 1 and showing the parts on a larger scale.

Fig. 3 is a fragmentary front elevational view.

Fig. 4 is a fragmentary sectional view taken approximately in the plane of line 4—4 of Fig. 2 and illustrating the means for adjusting the connection between the spindle and the actuating cam.

Fig. 5 is a transverse sectional view taken in the plane of line 5—5 of Fig. 4 but on a larger scale.

Fig. 6 is a fragmentary side elevational view showing the feeding mechanism from the side opposite that in Fig. 2, and similar to Fig. 1 but on a larger scale.

Fig. 7 is a vertical sectional view taken approximately in the plane of line 7—7 of Fig. 3 and showing the means for automatically disengaging the spindle feed mechanism.

Fig. 8 is a detail view illustrating a part of that same means.

Figs. 9, 10 and 11 are detail views showing different forms of cams.

Referring now to the drawings, and especially to Fig. 1 thereof, we have shown and will hereinafter describe our invention as applied to a power driven drilling machine of the type in which the tool spindle is mounted for vertical reciprocation into and out of engagement with the work suitably supported below the spindle. In the machine herein shown, 10 designates an upwardly and forwardly inclined frame mounted upon a standard 11 also carrying a suitable work support 12. The upper portion of the frame provides a bearing for a spindle 13 and a bearing is provided in a forward extension 14 of the standard for the spindle sleeve 15, in which the spindle proper is journaled, the spindle and sleeve being held against relative axial movements in a well known manner. The inclined frame 10 also constitutes a housing for variable speed drive mechanism (not shown) to impart rotational movements to the spindle, and mounted on one side of said frame near the upper portion thereof is a feed box 16 containing the usual feed gearing (not shown) driven from the drive mechanism in the frame 10 and having a depending worm 17. The feed box is mounted for a slight tilting movement on a horizontal axis provided by a shaft 18 for the purpose of carrying the worm 17 into and out of mesh with a worm wheel 19 on a cross shaft 20 journaled in the forward extension 14 of the standard 11. When the worm 17 and worm wheel 20 are in mesh, the spindle is reciprocated toward and from the work support 12 through a cam and gear mechanism to be presently described, the upward or return movement of the spindle being effected in the present instance by a coiled spring 21 having a suitable bearing at its lower end and acting at its upper end against a fixed collar 22 on the spindle.

The operative connection between the cross shaft 20 and the spindle comprises in general a cam actuated gear element having a gearing connection with the spindle sleeve through a cross feed shaft. In the preferred construction the shaft 20 extends through the forward extension 14 of the standard 11 to the side thereof opposite the worm wheel 19 and carries a pinion 23 (Fig. 7). This pinion meshes with an internal gear 24 formed in a drum 25 (Fig. 4) journaled upon a sleeve 25$^b$ fixed in the frame extension 14 and forming a bearing for a cross feed shaft 26 parallel with the shaft 20. Rigid with the drum 25 is a circular plate or disk 27 constituting a carrier for a peripheral cam 28 rigidly but removably secured thereto as by means of screws 29. Coacting with this cam 28 is a roller 30 carried by a gear element 31, herein in the form of a segment, mounted on a stud shaft 32 carried by the standard 11. The segment 31 in turn meshes with a pinion 33 which in the present embodiment has a normal driving connection with the cross feed shaft 26 provided by a clutch 34, this clutch being employed for purposes of adjustment as will hereinafter appear. On the cross feed shaft 26 is fixed a feed pinion 35 in constant mesh with a rack bar 36 on the spindle sleeve 15.

It will be apparent that in the rotation of the cam 28 with the drum 25, the latter being driven from the pinion 23, shaft 20, worm wheel 19 and worm 17, the gear segment 31 will be swung on its axis 32 thus driving pinion 33. Because of its driving relation with the cross feed shaft 26 the pinion 33 effects the descent of the tool spindle through the operation of the feed pinion 35 and rack bar 36.

The cam 28 may be varied at will to impart movement to the tool spindle at the desired speed or speeds. Herein the cam shown has but a single lobe and is shaped to effect initially a rapid approaching movement of the tool spindle followed by a gradually decreasing rate of feed until the end of the downward stroke when the cam is cut away sharply to permit the rapid return of the spindle under the action of the spring 21, the segment 31 assuming in this operation its initial position ready for the next stroke.

It will be understood that the invention is not limited to the use of a cam having a single lobe only, as shown, but if desired two or more lobes may be provided with the lobes of similar shape (Fig. 9), or gradually increasing in the extent of their throw (Fig. 10); or the cam may be shaped to produce a dwell of the tool spindle at the end of the downward stroke when the operation being performed is that of facing the work (Fig. 11).

Referring now to the clutch connection between the pinion 33 driven by the gear segment 31 and the cross feed shaft 26, the arrangement is such that the relative positions of the tool spindle and the cam may be adjusted to vary the position of the cutting tool at the end of the feeding stroke relative to the work, thus controlling the depth of feed. This clutch connection (Fig. 4) comprises a clutch member 37 rigid with the pinion 33 and having inclined clutch teeth intermeshing with similar teeth on a second clutch member 38 rigid with the shaft 26. The member 38 is made in two interfitting sections 39 and 40, for a purpose which will presently appear, and held in position on the shaft by means of a collar 41 threaded on the shaft 26 and having a set screw 42. By loosening the collar 41 and turning it upon its threads in a direction to move it away from the member 39 the clutch member 38 may be disengaged from the clutch member 37 thus freeing the shaft 26 from the pinion 33. The shaft may then be rotated by hand through the medium of a handle 43 so as to adjust the tool spindle relative to the gear segment 31 and hence to the cam 28.

The adjustment thus provided is obviously limited in degree to a distance between two of the teeth of the interengaging clutch members. In order that a finer adjustment may be effected the sectional construction of the clutch member 38 is employed and provision is made for a further relative adjustment between the two sections of this clutch member. As shown in Fig. 5, the section 39 is cup shaped in form and the section 40 is keyed on the shaft 26 and has a portion fitting into the section 39 and cut away on one side to form a rib 44. Engaging with opposite sides of this rib are a pair of adjusting screws 45 mounted in the cup-shaped section 39 approximately tangentially relative thereto. This construction normally effects a rigid connection between the two sections of the clutch member and the shaft 26, but one which is adjustable to effect minute variations in the relation of the tool spindle and the actuating cam.

Under some conditions it is desirable at the end of each operation of the tool to disengage the drive for the feed mechanism. This may be done manually if desired, but we have provided means whereby this operation may be accomplished either manually or automatically at the end of the operation.

Referring first to the manual operation, a hand lever 46 is provided (Figs. 1 and 6) pivoted at 47 on the frame 10 and extending forwardly to a point a short distance in front of the spindle. At its rear end the lever 46 has an operative connection with the pivoted feed box 16. This connection comprises in the present instance a yoke 48 formed on the rear end of the lever and carrying in opposite legs screws 49 engaging with a lug 50 the latter being connected with the feed box through the medium of a depending portion 51. The forward end of the lever 46 carries a depending latch member 52 pivoted to the lever at 53 and having a forward handle portion 54 normally caused by a spring 55, acting between the handle 54 and the lever 46, to swing the lower portion of the latch member in a forward direction. Said lower portion of the latch member carries a dog 56 adapted to engage with the upper flat side of a stud 57 carried by the forward extension 14 of the standard 11. When it is desired to disengage the feed, the latch member 52 may be operated to disengage the dog 56 from the stud 57, permitting the lever 46 to drop, thus swinging the feed box 16 in a direction to move the worm 17 out of mesh with the worm wheel 19.

In the present instance we utilize this method of disengaging the feed to effect the automatic interruption of the operation after the spindle has returned to its uppermost position. To this end we provide means operable at a predetermined point in the rotation of the cam 28 to swing the latch member 52 out of engagement with the stud 57. This means (Fig. 3, 6 and 7) comprises a rock shaft 58 journaled in a bearing bracket 58ᵃ secured upon the front face of the extension 14 of the standard 11. This shaft carries at one end an arm 59 rigid therewith and connected by a link 60 to a depending portion 61 on the latch member 52. The other end of this rock shaft 58 has keyed thereon a collar 62 having a notch 63 therein (Fig. 7) forming a shoulder 64 adapted to be engaged by the nose 65 of a dog 66 mounted on the disk 27 carrying the cam 28. The dog 66 is normally spring pressed by a coiled torsion spring 67 (Fig. 8) to carry a forward stop portion 68 into engagement with the outer periphery of the drum 25. On the other hand a tail piece 69 is adapted to engage with the drum to limit the pivotal movement of the dog in the opposite direction. The arrangement is such that near the end of the downward feeding stroke of the spindle, the nose 65 of the dog engages the shoulder 64 of the collar 62, and in the continued movement of the dog the shaft 58 is rocked to disengage the latch member 52. Upon engaging the shoulder 64 the dog turns against the action of the spring 67 until the tail piece 69 engages the drum, and after the latch member 52 has been disengaged the shaft 58 is rotated by the weight of the lever 46 and associated parts and in such rotation the spring 67 restores the dog 66 to its initial or normal position in which it will clear the shoulder 64. Thus the dog is adapted to engage with the shoulder to initiate the desired rocking movement of the shaft 58, and by reason of its pivotal movement against the action of the spring 67 moves into position to continue the engagement with the shoulder 64 long enough to complete the rocking movement of the shaft 58. Thereafter the shaft 58 continues its rotation allowing the spring 67 to return the dog to its initial position in which the dog will clear the notch and ride by into the position shown in Fig. 7.

If desired the collar 62 may be mounted on the shaft 58 so as to be capable of movement laterally and hence out of the path of movement of the dog, thus rendering the latter ineffective. Any suitable means may be provided for yieldably retaining the collar in operative or inoperative position on the shaft 58, the means herein shown comprising a spring pressed ball detent 70 as shown in Fig. 7.

Summarizing the operation of the machine, in the feeding stroke of the tool spindle the cross feed shaft 26, which is in constant driving relation with the spindle through the pinion 35 and rack bar 36, is driven by the cam 28 through the adjustable clutch coupling 34, pinion 33 and gear element 31, the latter engaging with the cam through the medium of the roller 30. In the initial portion of the rotation of the cam a rapid approach of the tool spindle toward the work is effected. Thereafter the spindle is fed downwardly at the desired rate and at the completion of the operation the spindle returns rapidly under the action of the spring 21 and as permitted by the shape of the cam. It will be observed that the arrangement is such that the cam may be quickly and easily adjusted relative to the spindle through the adjustable clutch coupling, and that when desired the cam may be quickly and easily replaced by another cam of different shape. Also it will be seen that the cam is of a type capable of being very cheaply manufactured.

The operation of the feed mechanism may be interrupted manually when desired through the medium of the hand lever 46; or the feed may be disengaged automatically at the end of the operation with the spindle in its uppermost position, by means of the dog 66 engaging the notched collar 62 and rocking the shaft 58, thereby disengaging the latch member 52, after which the dog is permitted to move out of engagement with the collar permitting the latter to be restored manually through the operation of the lever 46 and latch member 52 for the next operation.

We claim as our invention:

1. A feed mechanism for machine tools comprising, in combination, a tool spindle, a frame having a head in which said spindle is mounted for reciprocation, a rack mounted on said spindle, a cross feed shaft having a pinion thereon meshing with said rack, a power driven cam disk rotatably mounted coaxially of said shaft and disposed closely adjacent one side of said head, a cam follower having a bearing support on the frame and having a gearing connection with said shaft to impart a predetermined rotational movement thereto in the rotation of the cam, whereby to impart a predetermined longitudinal movement to the spindle.

2. A feed mechanism for machine tools comprising, in combination, a tool spindle, a frame having a head in which said spindle is mounted for reciprocation, a rack mounted on said spindle, a cross feed shaft having a pinion thereon meshing with said rack, a driving pinion on said shaft at one side of said head, a gear element mounted on the frame and meshing with said driving pinion, a power driven cam disk rotatably supported by frame adjacent said gear element, and a cam follower on the gear element for imparting motion thereto in opposite directions successively whereby to reciprocate said spindle through said driving pinion.

3. A feed mechanism for machine tools comprising, in combination, a tool spindle, a frame having a head in which said spindle is mounted for reciprocation, a rack mounted on said spindle, a cross feed shaft having a pinion thereon meshing with said rack, a driving pinion on said shaft at one side of said head, a gear element mounted on the frame and meshing with said driving pinion, a power driven cam disk rotatably supported by the frame adjacent said gear element, and a cam follower on the gear element for imparting motion thereto in opposite directions successively in the rotation of the cam, whereby to reciprocate said spindle through said driving pinion, said cam being mounted to turn on the axis of said shaft between the driving pinion and the frame.

4. A feed mechanism for machine tools comprising, in combination, a tool spindle, a frame having a head in which said spindle is mounted for reciprocation, a rack mounted on said spindle, a cross feed shaft having a pinion thereon meshing with said rack, a driving pinion on said shaft at one side of said head, a gear element mounted on the frame and meshing with said driving pinion, a power driven cam disk rotatably supported by the frame adjacent said gear element, and a cam follower on the gear element for imparting motion thereto in opposite directions successively in the rotation of the cam whereby to reciprocate said spindle through said driving pinion, said driving pinion having an angularly adjustable connection with the shaft.

5. A machine tool having a spindle, a feed shaft for the spindle, means for rotating said shaft including a pair of disengageable elements, a latch device operating to hold said elements in driving relation, a rock shaft operatively connected with said latch device, a dog mounted for movement at a predetermined speed in proportion to the rate of feed of the spindle, and a collar on said rock shaft having a notch therein, said dog having a part adapted to engage in said notch to rock the shaft, said dog being capable of a limited movement upon engagement with said notch, and spring means operating to effect a disengagement of the dog from the notch after the tripping operation.

6. In a machine tool having a reciprocatory spindle and feeding means for the spindle, the combination of a trip mechanism for said feeding means, and means for automatically operating said trip mechanism at a predetermined point in the travel of the spindle comprising a rocker member, and an element rotating in the feeding movement of the spindle to engage said rocker member to actuate it, said rocker member comprising a shaft operatively connected with the trip mechanism so as to be rocked thereby when the feed is disengaged, a part on said shaft providing an abutment at one side of the axis of the shaft, and said rotating element being adapted to engage with said abutment to rock the shaft and to clear said abutment when the shaft is rocked by the trip mechanism.

7. A drilling machine or the like having, in combination, a frame, a tool spindle mounted for vertical reciprocation in the frame, feeding means for the spindle including a cross feed shaft in geared relation to the spindle and projecting to one side of the frame, a drum journalled on said projecting end of the shaft adjacent the frame and having an internal gear formed therein, a driven shaft journalled in the frame and having a pinion meshing with said internal gear, a pinion on said cross feed shaft and in driving relation thereto, a cam secured to the outer face of the said drum, and a gear element mounted on the frame for movement in a fixed path and meshing with the pinion on the cross feed shaft, said gear element having a follower with which said cam engages whereby in the rotation of the cam the reciprocation of the spindle is effected.

8. A drilling machine or the like having, in combination, a frame, a tool spindle mounted for vertical reciprocation in said frame, a cross feed shaft journalled in the frame and having a feed pinion thereon, said spindle having a sleeve with a rack meshing with said pinion, a second shaft journalled in the frame parallel to the cross feed shaft and connected with a source of power, a disk journalled on the cross feed shaft and having a gear rigid therewith, said feed shaft having a portion projecting from one side of the frame to support the disk, a pinion on the second shaft meshing with said gear, a gear element movably mounted on the frame, a pinion in driving relation to the cross feed shaft and meshing with said gear element, and a cam removably secured to said disk and having a follower on said gear element whereby the element is reciprocated in the rotation of the cam to impart reciprocatory movements to the spindle.

9. A machine tool having a reciprocatory spindle, a frame member in which said spindle is mounted, a shaft journaled in the frame member and having a gearing connection with the spindle to move it, said shaft having a portion projecting from and terminating at one side of the frame, a gear element mounted to turn on said projecting end of the shaft adjacent the frame, a cam encircling the shaft and rigid with said gear element, a second gear element mounted on the shaft adjacent the first gear element, a cam follower mounted for movement in a fixed path and operable in the rotation of the cam to rotate said second gear element, and means for adjustably securing the second gear element to the shaft so as to vary the angular relation thereof to the shaft.

10. A machine tool having a reciprocatory spindle, a frame member in which said spindle is mounted, a shaft journaled in the frame member and having a gearing connection with the spindle to move it, said shaft having a portion projecting from and terminating at one side of the frame, a gear element mounted to turn on said projecting end of the shaft adjacent the frame, a cam encircling the shaft and rigid with said gear element, a second gear element mounted on the shaft adjacent the first gear element, a cam follower mounted on the frame member and operable in the rotation of the cam to rotate said second gear element, and means for adjustably securing the second gear element to the shaft so as to vary the angular relation thereof to the shaft, the last mentioned means including a member splined on the shaft near the end thereof and a nut on the end of the shaft serving to hold the parts thereon in assembled relation.

11. A machine tool having a spindle, a frame member in which the spindle is mounted for reciprocation, a cross feed shaft journaled in the frame member and operatively connected with the spindle, said shaft having one end projecting from the frame member, a power driven cam rotatably mounted on the shaft adjacent the frame member, a pinion on the shaft adjacent said cam, a cam follower operable to drive said pinion, and a pair of clutch members on said shaft adapted to provide a connection between the pinion and shaft, one of said clutch members being rigid with the pinion and the other clutch member being secured to the shaft and movable axially thereof to effect disengagement of the clutch, and means on the free end of the shaft for holding the clutch members in positive engagement.

12. A machine tool having, in combination with a frame, a reciprocatory spindle in said frame, a cross feed shaft journaled in said frame and operatively connected to said spindle to reciprocate the latter, said shaft having a portion projecting from and terminating at one side of the frame, a gear loosely rotatable on said shaft, a power shaft geared to said gear, a cam connected with said gear for rotation therewith about said feed shaft, a pinion on said feed shaft in driving relation thereto, a gear element mounted on said frame and meshing with said pinion, and a follower on said gear element coacting with said cam to convert rotation thereof into predetermined operation of said spindle.

In testimony whereof we have hereunto affixed our signatures.

ALBERT M. JOHNSON.
WALTER M. FAIRBAIRN.